United States Patent
Hsieh et al.

(10) Patent No.: US 10,180,786 B1
(45) Date of Patent: Jan. 15, 2019

(54) CONTROL CIRCUIT PROGRAMMING LEVELS OF PINS AND OPERATING SYSTEM UTILIZING THE SAME

(71) Applicant: Nuvoton Technology Corporation, Hsinchu (TW)

(72) Inventors: Yu-Che Hsieh, Changhua County (TW); Tzu-Lan Shen, Taoyuan (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 0 days.

(21) Appl. No.: 15/870,892

(22) Filed: Jan. 13, 2018

(30) Foreign Application Priority Data

Jul. 11, 2017 (TW) .............................. 106123180 A

(51) Int. Cl.
*G06F 3/06* (2006.01)
*G06F 13/38* (2006.01)

(52) U.S. Cl.
CPC .............. *G06F 3/06* (2013.01); *G06F 13/385* (2013.01); *G06F 2003/0691* (2013.01)

(58) Field of Classification Search
CPC ............. G06F 17/5031; G06F 2217/62; G06F 2217/84; H03K 19/1774; H03K 19/17744; H03K 2005/00019
USPC ................... 716/113, 134; 326/93; 710/1, 52
See application file for complete search history.

(56) References Cited

U.S. PATENT DOCUMENTS

| | | | | |
|---|---|---|---|---|
| 5,555,204 A | * | 9/1996 | Endoh | G11C 11/5621 365/185.17 |
| 5,859,776 A | * | 1/1999 | Sato | G06F 17/505 700/121 |
| 5,872,741 A | * | 2/1999 | Abo | G11C 7/1051 365/189.05 |
| 6,002,282 A | * | 12/1999 | Alfke | G06F 1/10 327/149 |
| 6,133,960 A | * | 10/2000 | Mendenhall | G06T 3/40 345/660 |

(Continued)

FOREIGN PATENT DOCUMENTS

| | | |
|---|---|---|
| CN | 101017424 A | 8/2007 |
| TW | 200504514 A | 2/2005 |
| TW | 200601138 A | 1/2006 |

OTHER PUBLICATIONS

Taiwanese Notice of Allowance dated Mar. 12, 2018 for the corresponding application No. 106123180; pp: 1-3.

*Primary Examiner* — Faisal M Zaman
(74) *Attorney, Agent, or Firm* — Muncy, Geissler, Olds & Lowe, P.C.

(57) ABSTRACT

A control circuit programming levels of pins is provided. A first slot is configured to adjust a first count value according to a clock signal. A timer controller is configured to determine whether the first count value is equal to a first predetermined value. When the first count value is equal to the first predetermined value, the timer controller generates a first trigger signal. A buffer controller is configured to access the input/output buffer. A pin controller is coupled to a first pin, the timer controller and the buffer controller. In an input mode, the pin controller detects the voltage level of the first pin according to the first trigger signal to generate a plurality of detection results. In an output mode, the pin controller generates an output signal according to the first trigger signal and output data stored in the input/output buffer.

20 Claims, 5 Drawing Sheets

(56) References Cited

U.S. PATENT DOCUMENTS

| | | | |
|---|---|---|---|
| 6,559,783 B1 | 5/2003 | Stoneking | |
| 8,598,908 B1* | 12/2013 | Sullam | G06F 13/385 326/41 |
| 2001/0026179 A1 | 10/2001 | Saeki | |
| 2007/0043881 A1* | 2/2007 | Li | G06F 11/323 710/1 |

* cited by examiner

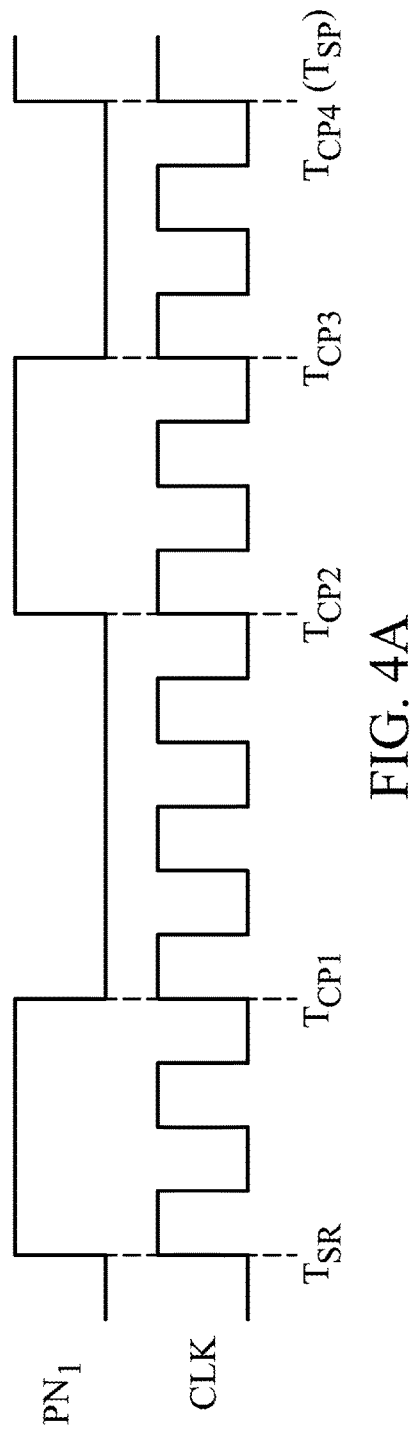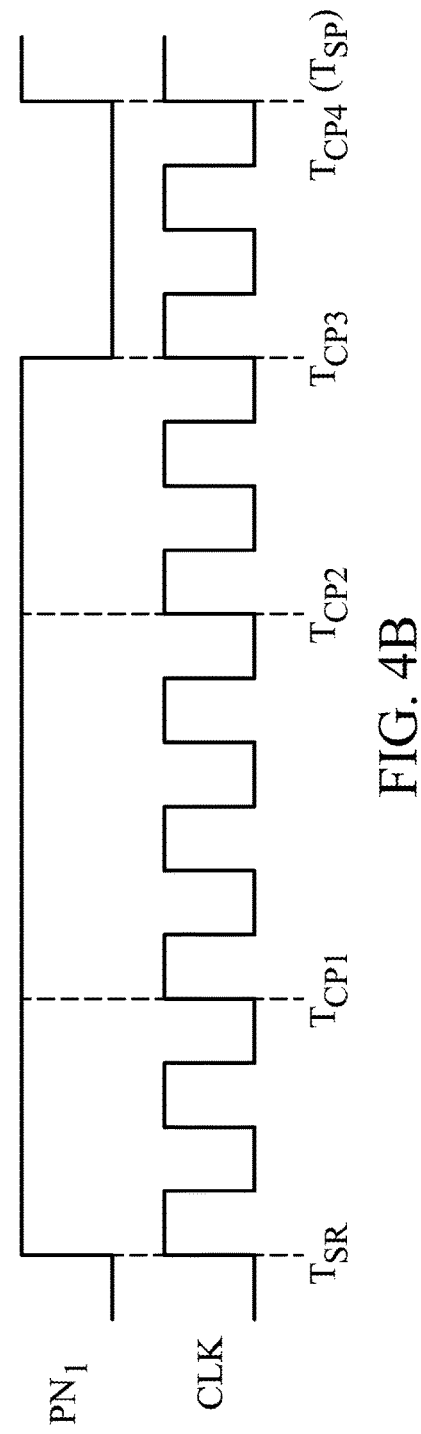

CONTROL CIRCUIT PROGRAMMING LEVELS OF PINS AND OPERATING SYSTEM UTILIZING THE SAME

CROSS REFERENCE TO RELATED APPLICATIONS

This Application claims priority of Taiwan Patent Application No. 106123180, filed on Jul. 11, 2017, the entirety of which is incorporated by reference herein.

BACKGROUND OF THE INVENTION

Field of the Invention

The invention relates to a control circuit, and more particularly to a control circuit which is capable of programming the levels of pins.

Description of the Related Art

With the development of technology, the sizes of integrated circuits (ICs) have been reduced and the circuit structures of ICs have become increasingly complex. Taking VLSI (very large scale integration) as an example, the number of elements has increased.

BRIEF SUMMARY OF THE INVENTION

In accordance with an embodiment, a control circuit programs levels of pins and comprises a first slot, a timer controller, an input/output buffer, a buffer controller and a pin controller. The first slot is configured to adjust a first count value according to a clock signal. The timer controller is configured to determine whether the first count value is equal to a first predetermined value. When the first count value is equal to the first predetermined value, the timer controller generates a first trigger signal. The buffer controller is configured to access the input/output buffer. The pin controller is coupled to a first pin, the timer controller and the buffer controller. In an input mode, the pin controller detects a voltage level of the first pin according to the first trigger signal to generate a plurality of detection results. In the input mode, the pin controller stores the plurality of detection results into the input/output buffer via the buffer controller. In an output mode, the pin controller generates an output signal according to the first trigger signal and output data stored in the input/output buffer.

In accordance with another embodiment, an operating system comprises an integrated circuit and a control circuit. The control circuit is coupled to the integrated circuit via a first pin and comprises a first slot, a timer controller, an input/output buffer, a buffer controller and a pin controller. The first slot is configured to adjust a first count value according to a clock signal. The timer controller is configured to generate a first trigger signal when the first count value is equal to a first predetermined value. The buffer controller is configured to access the input/output buffer. The pin controller is coupled to the first pin, the timer controller and the buffer controller. In an input mode, the pin controller detects a voltage level of the first pin according to the first trigger signal to generate a plurality of detection results. In the input mode, the pin controller stores the plurality of detection results to the input/output buffer via the buffer controller. In an output mode, the pin controller generates an output signal to the integrated circuit according to the first trigger signal and output data stored in the input/output buffer.

BRIEF DESCRIPTION OF THE DRAWINGS

The invention can be more fully understood by referring to the following detailed description and examples with references made to the accompanying drawings, wherein:

FIG. 4A is a schematic diagram of the voltage level of a pin in an input mode according to various aspects of the present disclosure.

FIG. 4B is a schematic diagram of the voltage level of the pin in an output mode according to various aspects of the present disclosure.

DETAILED DESCRIPTION OF THE INVENTION

Figure 1:
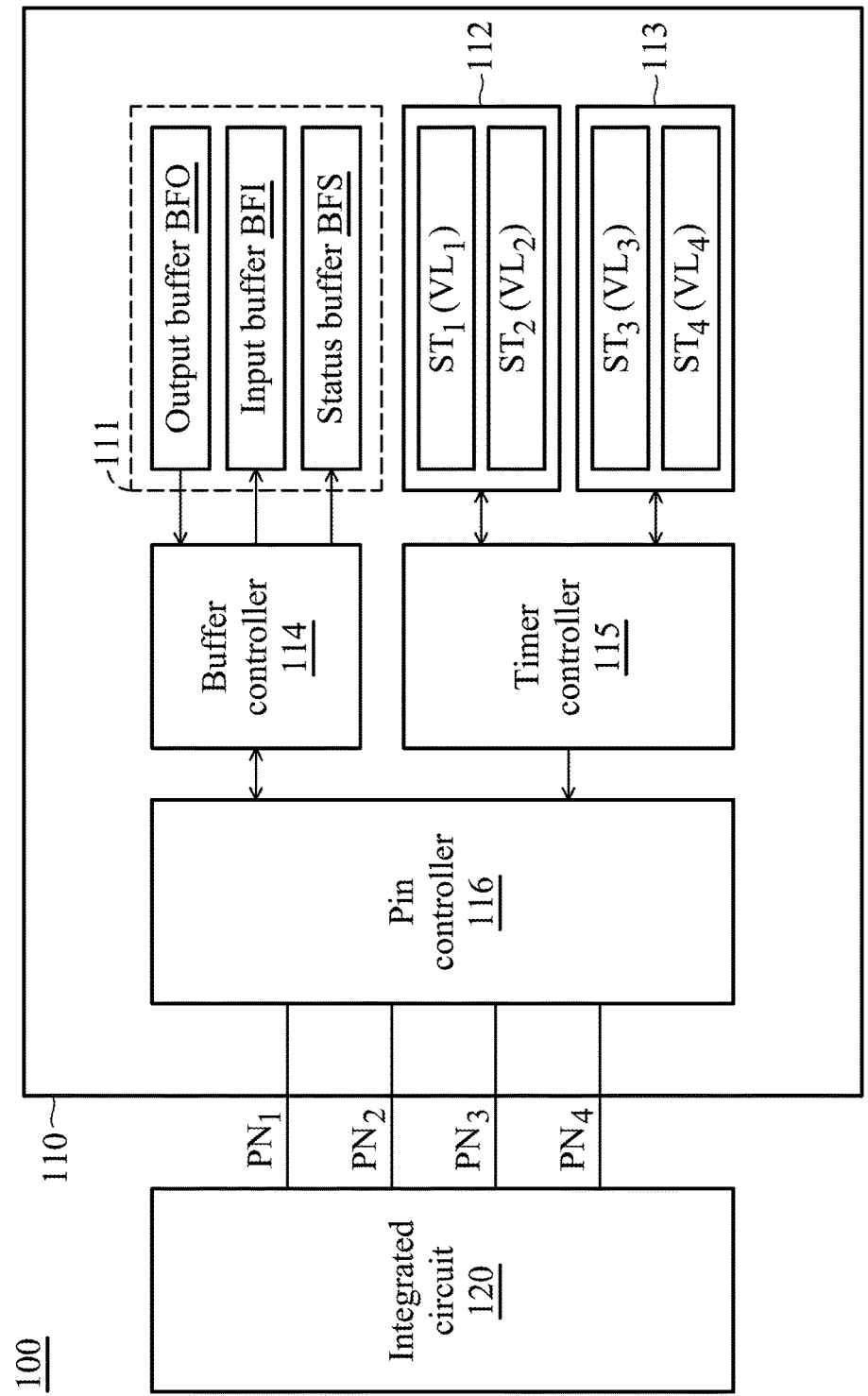
FIG. 1 is a schematic diagram of an exemplary embodiment of an operating system according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operating system, according to various aspects of the present disclosure. The operating system 100 comprises a control circuit 110 and an integrated circuit 120. The control circuit 110 communicates with the integrated circuit 120 via the pins $PN_1 \sim PN_4$, but the disclosure is not limited thereto. In other embodiments, the control circuit 110 may utilize more or fewer than four pins to provide information to the integrated circuit 120 or to receive information from the integrated circuit 120. In this embodiment, when the control circuit 110 executes a programmed code (not shown) stored in itself, the control circuit 110 programs the voltage level of at least one of the pins $PN_1 \sim PN_4$ such that the communication between the control circuit 110 and the integrated circuit 120 conforms with a communication protocol. In one embodiment, the control circuit 110 simulates a serial communication protocol, but the disclosure is not limited thereto. In another embodiment, the control circuit 110 simulates a parallel communication protocol. In some embodiments, when the control circuit 110 executes the programmed code (not shown) stored in itself, the control circuit 110 receives the information provided from the integrated circuit 120 according to the voltage level of at least one of the pins $PN_1 \sim PN_4$. In other embodiments, the control circuit 110 serves as a clock generator. In this case, when the control circuit 110 executes a programmed code (not shown) stored in itself, the control circuit 110 outputs a pulse width modulation (PWM) signal to the integrated circuit 120.

In this embodiment, each of the pins $PN_1$~$PN_4$ performs different roles to transmit different signals in different times. Taking the pin $PN_1$ as an example, during a first work period, the control circuit 110 may serve the pin $PN_1$ as a clock pin to transmit a clock signal to the integrated circuit 120 or receive a clock signal from the integrated circuit 120 after the control circuit 110 executes an internal programmed code. During a second work period, the control circuit 110 may transmit data to the integrated circuit 120 or receive data from the integrated circuit 120 via the pin $PN_1$. During a third work period, the pin $PN_1$ may serve as an input/output pin. Since each of the pins $PN_1$~$PN_4$ is capable of transmitting signals, which have different types, the utility rate of the pins $PN_1$~$PN_4$ is increased and the number of pins between the control circuit 110 and the integrated circuit 120 is not too high.

In this embodiment, the control circuit 110 is configured to program the voltage levels of the pins $PN_1$~$PN_4$ and at least comprises an input/output buffer 111, timers 112 and 113, a buffer controller 114, a timer controller 115 and a pin controller 116. FIG. 1 shows the elements related to the invention that are discussed, but the invention is not limited thereto. The control circuit 110 still may comprise other hardware devices, firmware or software, which are not discussed for brevity.

The input/output buffer 111 is configured to store data. In one embodiment, the control circuit 110 stores the data received from the integrated circuit 120 to the input/output buffer 111. In another embodiment, the control circuit 110 reads the data stored in the input/output buffer 111 and provides the stored data to the integrated circuit 120. In the disclosure, the circuit structure of the input/output buffer 111 is not limited. Any circuit can serve as an input/output buffer 111, as long as the circuit is capable of storing data. In this embodiment, the input/output buffer 111 comprises an output buffer BFO, an input buffer FGI and a status buffer BFS.

The output buffer BFO is configured to store the output data to be provided to the integrated circuit 120. In one embodiment, a central processing unit (CPU) writes the output data into the output buffer BFO. The input buffer BFI is configured to store the input data received by the control circuit 110. The status buffer BFS is configured to store the status data received by the control circuit 110. For example, assume that the control circuit 110 receives input information which has a plurality of bits. The bits of the input information comprise at least one start bit, at least one data bit and at least one stop bit. In one embodiment, the control circuit 110 stores the value of the start bit and the value of the stop bit into the status buffer BFS and stores the value of the data bit into the input buffer BFI.

The buffer controller 114 is coupled between the pin controller 116 and the input/output buffer 111 to access the input/output buffer 111. For example, when the control circuit 110 operates in an output mode, the buffer controller 114 reads the output data stored in the output buffer BFO and provides the stored output data to the pin controller 116. The pin controller 116 outputs the stored output data to the integrated circuit 120 via at least one of the pins $PN_1$~$PN_4$. When the control circuit 110 operates in an input mode, the pin controller 116 provides the input information received by at least one of the pins $PN_1$~$PN_4$ to the buffer controller 114. The input information comprises initial data, stop data and input data. Then, the buffer controller 114 stores the initial data and the stop data into the status buffer BFS and stores the input data into the input buffer BFI. The internal circuit of the buffer controller 114 is not limited in the present disclosure. Any circuit can serve as a buffer controller 114, as long as the circuit is capable of accessing buffers.

In this embodiment, the timer controller 115 is coupled to the timers 112 and 113, but the disclosure is not limited thereto. In other embodiments, the timer controller 115 is coupled to more timers or fewer timers. The timer 112 comprises slots $ST_1$ and $ST_2$, but the disclosure is not limited thereto. In other embodiments, the timer 112 comprises more or fewer than two slots. In this embodiment, the timer 113 comprises slots $ST_3$ and $ST_4$, but the disclosure is not limited thereto. In other embodiments, the timer 113 comprises more or fewer than two slots. In this embodiment, the number of slots of the timer 112 is the same as the number of slots of the timer 113, but the disclosure is not limited thereto. In other embodiments, the number of slots of the timer 112 may be more than or less than the number of slots of the timer 113. Since the feature of the timer 112 is the same as the feature of the timer 113, the timer 112 is given as an example.

As shown in FIG. 1, the slot $ST_1$ has a count value $VL_1$, and the slot $ST_2$ has a count value $VL_2$. When the slot $ST_1$ is activated, the slot $ST_1$ increases or reduces the count value $VL_1$ according to a first clock signal. Similarly, when the slot $ST_2$ is activated, the slot $ST_2$ increases or reduces the count value $VL_2$ according to a second clock signal. In this case, the frequency of the first clock signal may be the same as or different from the frequency of the second clock signal.

Additionally, the first and second clock signals may be provided from a single clock source or provided from different clock sources. In one embodiment, the first and second clock signals are the same clock signal. Furthermore, the slot $ST_1$ may be directly coupled to a first clock source to receive the first clock signal. In other embodiments, the slot $ST_1$ may be indirectly coupled to the first clock source. For example, at least one prescaler is disposed between the slot $ST_1$ and the first clock source. Similarly, the slot $ST_2$ may be directly coupled to a second clock source to receive the second clock signal. In other embodiments, the slot $ST_2$ may be indirectly coupled to the second clock source. For example, at least one prescaler is disposed between the slot $ST_2$ and the second clock source. In some embodiments, one of the slots $ST_1$ and $ST_2$ is directly coupled to the corresponding clock source and the other is indirectly coupled to the corresponding clock source.

The timer controller 115 is coupled to the timers 112 and 113 and outputs a plurality of trigger signals to the pin controller 116 according to the count values $VL_1$~$VL_4$ of the slots $ST_1$~$ST_4$. For example, when the count value $VL_1$ is equal to a first predetermined value, the timer controller 115 generates a first trigger signal to the pin controller 116. Similarly, when the count value $VL_2$ is equal to a second predetermined value, the timer controller 115 generates a second trigger signal to the pin controller 116. When the count value $VL_3$ is equal to a third predetermined value, the timer controller 115 generates a third trigger signal to the pin controller 116. When the count value $VL_4$ is equal to a fourth predetermined value, the timer controller 115 generates a fourth trigger signal to the pin controller 116. The first, second, third and fourth predetermined values are different. In one embodiment, the first predetermined value is less than the second predetermined value, the second predetermined value is less than the third predetermined value, the third predetermined value is less than the fourth predetermined value. In other embodiments, one of the first, second, third and fourth predetermined values is equal to another of the first, second, third and fourth predetermined values.

In one embodiment, the first, second, third and fourth predetermined values may be set by the timer controller 115. In other embodiments, the first, second, third and fourth predetermined values are set by another controller (not shown) disposed in the control circuit 110. In some embodiments, the slots $ST_1 \sim ST_4$ are controlled by the timer controller 115. For example, the timer controller 115 activates the slots $ST_1 \sim ST_4$. When the slots $ST_1 \sim ST_4$ are activated, the slots $ST_1 \sim ST_4$ increase or reduce the count values $VL_1 \sim VL_4$ respectively. In another embodiment, the timer controller 115 resets the count values $VL_1 \sim VL_4$ such that the count values $VL_1 \sim VL_4$ are equal to an initial value. In other embodiments, the slots $ST_1 \sim ST_4$ are controlled by another controller (not shown) disposed in the control circuit 110. In this case, the another controller of the control circuit 110 activates or resets the slots $ST_1 \sim ST_4$.

In this embodiment, when the count value $VL_1$ is equal to the first predetermined value, the timer controller 115 resets the slot $ST_1$ such that the count value $VL_1$ is equal to an initial value. When the count value $VL_2$ is equal to the second predetermined value, the timer controller 115 resets the slot $ST_2$ such that the count value $VL_2$ is equal to an initial value. When the count value $VL_3$ is equal to the third predetermined value, the timer controller 115 resets the slot $ST_3$ such that the count value $VL_3$ is equal to an initial value. When the count value $VL_4$ is equal to the third predetermined value, the timer controller 115 resets the slot $ST_4$ such that the count value $VL_4$ is equal to an initial value. In one embodiment, when one of the count values $VL_1 \sim VL_4$ is equal to the corresponding initial value, the timer controller 115 activates the corresponding slot among the slots $ST_1 \sim ST_4$ such that the corresponding slot performs a counting operation, for example, the corresponding slot may adjust the corresponding count value again. The invention does not limit the number that each of slot $ST_1 \sim ST_4$ performs the counting operation. In one embodiment, the number of times the counting operation is performed by each of slots $ST_1 \sim ST_4$ is controlled by the timer controller 115.

The pin controller 116 is coupled to the timer controller 115 and the buffer controller 114 and is coupled to the integrated circuit 120 via the pins $PN_1 \sim PN_4$. In this embodiment, the pin controller 116 controls or detects the voltage level of at least one of the pins $PN_1 \sim PN_4$ according to the time points when the timer controller 115 generates the trigger signals. Therefore, the time points when the timer controller 115 generates the trigger signals are referred to as checkpoints. The pin controller 116 controls or detects the voltage level of at least one of the pins $PN_1 \sim PN_4$ at the checkpoints.

Assume that when the count value $VL_1$ of the slot $ST_1$ is equal to a first predetermined value, the timer controller 115 generates a first trigger signal. In this case, the time point when the timer controller 115 generates the first trigger signal is referred to as a first checkpoint. Assume that when the count value $VL_2$ of the slot $ST_2$ is equal to a second predetermined value, the timer controller 115 generates a second trigger signal. In this case, the time point when the timer controller 115 generates the second trigger signal is referred to as a second checkpoint. Assume that when the count value $VL_3$ of the slot $ST_3$ is equal to a third predetermined value, the timer controller 115 generates a third trigger signal. In this case, the time point when the timer controller 115 generates the third trigger signal is referred to as a third checkpoint. Assume that when the count value $VL_4$ of the slot $ST_4$ is equal to a fourth predetermined value, the timer controller 115 generates a fourth trigger signal. In this case, the time point when the timer controller 115 generates the fourth trigger signal is referred to as a fourth checkpoint.

Taking the pin $PN_1$ as an example, during an input mode, the pin controller 116 detects the voltage level of the pin $PN_1$ at the first, second, third and fourth checkpoints to generate many detection results. In one embodiment, the pin controller 116 immediately detects the voltage level of the pin $PN_1$ at the first, second, third and fourth checkpoints. In other words, each when the pin controller 116 receives the trigger signals generated by the timer controller 115, the pin controller 116 immediately detects the voltage level of the pin $PN_1$. In another embodiment, the pin controller 116 detects the voltage level of the pin $PN_1$ between two checkpoints (e.g. the first and second checkpoints). For example, after the first checkpoint, the pin controller 116 waits a predetermined time and then detects the voltage level of the pin $PN_1$, wherein the predetermined time is shorter than the time between the first and second checkpoints. In this embodiment, the pin controller 116 stores the detection results to the input/output buffer 111 via the buffer controller 114. In an output mode, the pin controller 116 reads the output data stored in the input/output buffer 111 via the buffer controller 114 at the first, second, third and fourth checkpoints and generates an output signal to the integrated circuit 120 according to the stored output data. Taking the first checkpoint as an example, the pin controller 116 may immediately read the output data stored in the input/output buffer 111 at the first checkpoint or may wait a predetermined time after the first checkpoint and then read the output data stored in the input/output buffer 111. In one embodiment, the pin controller 116 outputs the output signal via at least one of the pins $PN_1 \sim PN_4$. For example, assume that the pin controller 116 detects the voltage level of the pin $PN_1$ in the input mode. In this case, the pin controller 116 may utilize the pin $PN_1$ to output the output signal in the output mode. In another embodiment, the pin controller 116 utilizes the pin $PN_2$ to output the output signal.

In some embodiments, when the control circuit 110 operates in the output mode, the pin controller 116 maintains or changes the voltage level of at least one of the pins $PN_1 \sim PN_4$ at the first, second, third and fourth checkpoints to generate a PWM signal to the integrated circuit 120. Taking the pin $PN_1$ as an example, the pin controller 116 sets the voltage level of the pin $PN_1$ at a high level at the first checkpoint. The pin controller 116 sets the voltage level of the pin $PN_1$ at a low level at the second checkpoint. The pin controller 116 sets the voltage level of the pin $PN_1$ at the high level at the third checkpoint. The pin controller 116 sets the voltage level of the pin $PN_1$ at the low level at the fourth checkpoint.

In the above embodiments, the timer controller 115 generates many trigger signals according to the count values of different slots, but the disclosure is not limited thereto. In other embodiments, the timer controller 115 generates many trigger signals according to the count values of a slot. For example, when the count value $VL_1$ of the slot $ST_1$ is equal to a predetermined value, the timer controller 115 generates a trigger signal to the pin controller 116. Next, the timer controller 115 first resets the slot $ST_1$ and then activates the slot $ST_1$ such that the slot $ST_1$ increases or reduces the count value $VL_1$ again. When the count value $VL_1$ of the slot $ST_1$ is equal to the predetermined value again, the timer controller 115 generates the trigger signal to the pin controller 116 again. Therefore, the timer controller 115 is capable of generating a plurality of trigger signals according to the count values of a single slot.

FIG. 4A is a schematic diagram of the voltage level of the pin $PN_1$ in an input mode according to various aspects of the present disclosure. In the input mode, when the timer controller 115 sends a trigger signal, the pin controller 116 reads the voltage level of the pin $PN_1$ and stores the voltage level of the pin $PN_1$. In this embodiment, the symbol CLK represents a clock signal, wherein the slots $ST_1 \sim ST_4$ adjusts the count values $VL_1 \sim VL_4$ according to the clock signal CLK.

The symbol $T_{SR}$ represents a start time point of input data. The start time point of the input data is an end time point of initial data. In one embodiment, the voltage level (e.g. a low level) before the start time point $T_{SR}$ is stored in the status buffer BFS.

The symbol $T_{CP1}$ is a first checkpoint. The first checkpoint is a time point when the timer controller 115 sends a first trigger signal. In one embodiment, when the count value $VL_1$ is equal to a first predetermined value, the timer controller 115 sends the first trigger signal. At the first checkpoint $T_{CP1}$, the pin controller 116 determines that the voltage level of the pin $PN_1$ is a high level such that the pin controller 116 writes the value "1" into the input buffer BFI. Therefore, the value stored in the input buffer BFI is [1].

The symbol $T_{CP2}$ is a second checkpoint. The second checkpoint is a time point when the timer controller 115 sends a second trigger signal. In one embodiment, when the count value $VL_2$ is equal to a second predetermined value, the timer controller 115 sends the second trigger signal. At the second checkpoint $T_{CP2}$, the pin controller 116 determines that the voltage level of the pin $PN_1$ is a low level such that the pin controller 116 writes the value "0" into the input buffer BFI. Therefore, the value stored in the input buffer BFI is [10].

The symbol $T_{CP3}$ is a third checkpoint. The third checkpoint is a time point at which the timer controller 115 sends a third trigger signal. In one embodiment, when the count value $VL_3$ is equal to a third predetermined value, the timer controller 115 sends the third trigger signal. At the third checkpoint $T_{CP3}$, the pin controller 116 determines that the voltage level of the pin $PN_3$ is the high level such that the pin controller 116 writes the value "1" into the input buffer BFI. Therefore, the value stored in the input buffer BFI is [101].

The symbol $T_{CP4}$ is a fourth checkpoint. The fourth checkpoint is a time point at which the timer controller 115 sends a fourth trigger signal. In one embodiment, when the count value $VL_4$ is equal to a fourth predetermined value, the timer controller 115 sends the fourth trigger signal. At the fourth checkpoint $T_{CP4}$, the pin controller 116 determines that the voltage level of the pin $PN_1$ is a low level such that the pin controller 116 writes the value "0" into the input buffer BFI. Therefore, the value stored in the input buffer BFI is [1010]. Furthermore, the fourth checkpoint $T_{CP4}$ is also an end time point $T_{SP}$. Therefore, the pin controller 116 detects and stores the voltage level (e.g. a high level) to the status buffer BFS, wherein the stored voltage level occurs after the end time point $T_{SP}$.

FIG. 4B is a schematic diagram of the voltage level of the pin $PN_1$ in an output mode according to various aspects of the present disclosure. In the output mode, when the timer controller 115 sends a trigger signal, the pin controller 116 reads the output data stored in the input/output buffer 111 and controls the voltage level of the pin $PN_1$ according to the stored output data. In this embodiment, the symbol CLK represents a clock signal, wherein the slots $ST_1 \sim ST_4$ adjust the count values $VL_1 \sim VL_4$ according to the clock signal CLK. The symbol $T_{SR}$ represents a start time point. Before the start time point $T_{SR}$, the voltage level of the pin $PN_1$ is a predetermined voltage level, such as a low level.

At the first checkpoint $T_{CP1}$, the pin controller 116 reads output data stored in the output buffer BFO. Assume that the value of the output data is [1110]. The output buffer BFO outputs the most significant bit (MSB) of the output data to the pin controller 116. Since the value of the MSB of the output data is "1", the pin controller 116 sets and maintains the voltage level of the pin $PN_1$ at a high level between the start time point $T_{SR}$ and the first checkpoint $T_{CP1}$. At this time, the value stored in the output buffer BFO is [110].

At the second checkpoint $T_{CP2}$, the pin controller 116 reads the output data stored in the output buffer BFO. At this time, the value of the output data is [110]. The output buffer BFO outputs the MSB of the output data to the pin controller 116. Since the value of the MSB of the output data is "1", the pin controller 116 sets and maintains the voltage level of the pin $PN_1$ to the high level between the first checkpoint $T_{CP1}$ and the second checkpoint $T_{CP2}$. At this time, the value stored in the output buffer BFO is [10].

At the third checkpoint $T_{CP3}$, the pin controller 116 reads the output data stored in the output buffer BFO. At this time, the value of the output data is [10]. The output buffer BFO outputs the MSB of the output data to the pin controller 116. Since the value of the MSB of the output data is "1", the pin controller 116 sets and maintains the voltage level of the pin $PN_1$ to the high level between the second checkpoint $T_{CP2}$ and the third checkpoint $T_{CP3}$. At this time, the value stored in the output buffer BFO is [0].

At the fourth checkpoint $T_{CP4}$, the pin controller 116 reads the output data stored in the output buffer BFO. At this time, the value of the output data is [0]. The output buffer BFO outputs the MSB of the output data to the pin controller 116. Since the value of the MSB of the output data is "0", the pin controller 116 sets and maintains the voltage level of the pin $PN_1$ to a low level between the third checkpoint $T_{CP3}$ and the fourth checkpoint $T_{CP4}$. At this time, the value stored in the output buffer BFO has been output to the pin controller 116. Therefore, the slots $ST_1 \sim ST_4$ stops adjusting the count values $VL_1 \sim VL_4$. After the end time point $T_{SP}$, the voltage level of the pin $PN_1$ is maintained to a final level, such as a high level.

Figure 4C:
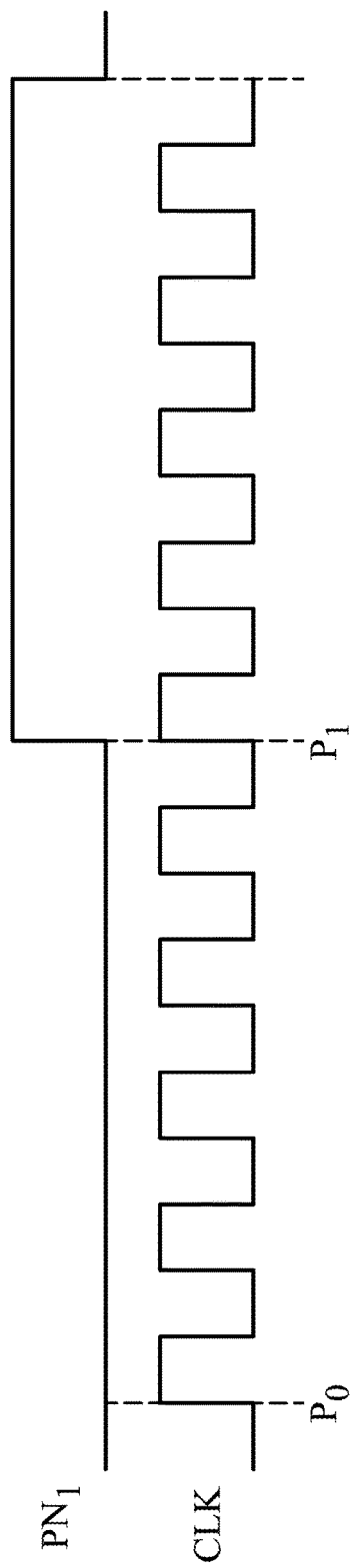
FIG. 4C is a schematic diagram of a pulse width modulation (PWM) signal generated by a pin controller of the present disclosure.

FIG. 4C is a schematic diagram of an exemplary embodiment of a PWM signal generated by the pin controller 116. In the output mode, the pin controller 116 changes the voltage level of the pin $PN_1$ at each checkpoint to generate a PWM signal. Assume that before the checkpoint $P_0$, the voltage level of the pin $PN_1$ is an initial level, such as a low level.

In the checkpoint $P_0$, the pin controller 116 controls the voltage level of the pin $PN_1$ at the low level. In the checkpoint $P_1$, the pin controller 116 changes the voltage level of the pin $PN_1$ from the low level to a high level. After the checkpoint $P_1$, the voltage level of the pin $PN_1$ is a final level, such as the low level. In this embodiment, the checkpoint $P_0$ represents a time point at which the timer controller 115 sends a trigger signal when the count value $VL_1$ of the slot $ST_1$ is equal to a first predetermined value. The checkpoint $P_1$ represents another time point at which the timer controller 115 sends another trigger signal when the count value $VL_2$ of the slot $ST_2$ is equal to a second predetermined value. In this case, the timer controller 115 controls the number of times the slots $ST_1$ and $ST_2$ perform a counting operation and generates a PWM signal having many pulses according to the number of executions of the counting operation.

Figure 2:
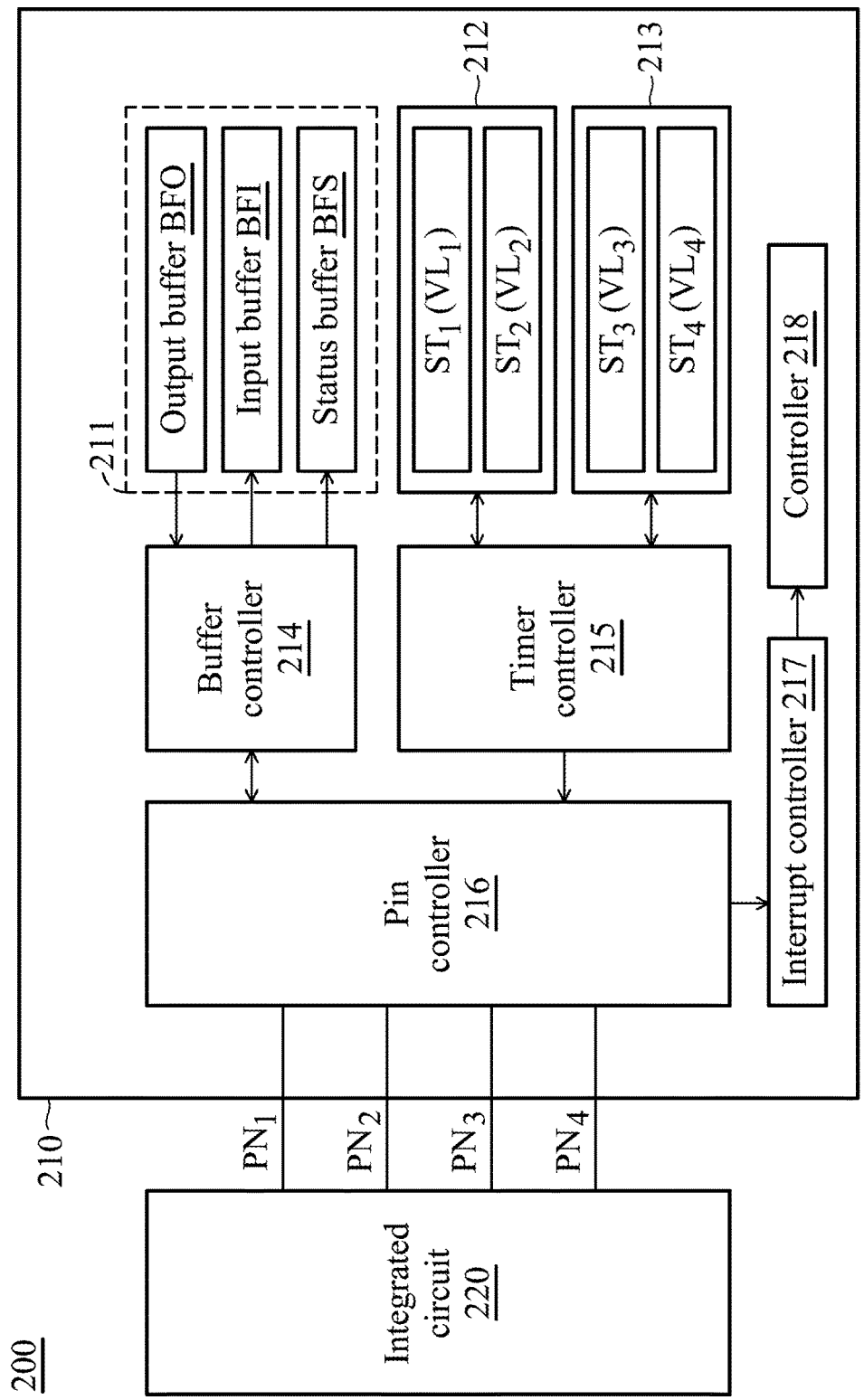
FIG. 2 is a schematic diagram of another exemplary embodiment of the operating system according to various aspects of the present disclosure.

FIG. 2 is a schematic diagram of another exemplary embodiment of the operating system, according to various aspects of the present disclosure. FIG. 2 is similar to FIG. 1 exception that the control circuit 210 of the operating system 200 shown in FIG. 2 further comprises an interrupt controller 217 and a controller 218. Since the features of the input/output buffer 211, the times 212 and 213, the buffer controller 214, the timer controller 215 and the pin controller 216 are the same as the features of the input/output buffer 111, the times 112 and 113, the buffer controller 114, the timer controller 115 and the pin controller 116 shown in FIG. 1, the descriptions of the features of the input/output buffer 211, the times 212 and 213, the buffer controller 214, the timer controller 215 and the pin controller 216 are omitted.

In this embodiment, when the pin controller 216 receives the trigger signal sent from the timer controller 215, the pin controller 216 activates the interrupt controller 217. Therefore, the interrupt controller 217 sends an interruption signal to the controller 218. The controller 218 executes a predetermined programmed code according to the interruption signal. In one embodiment, the predetermined programmed code is stored in a memory.

Figure 3:
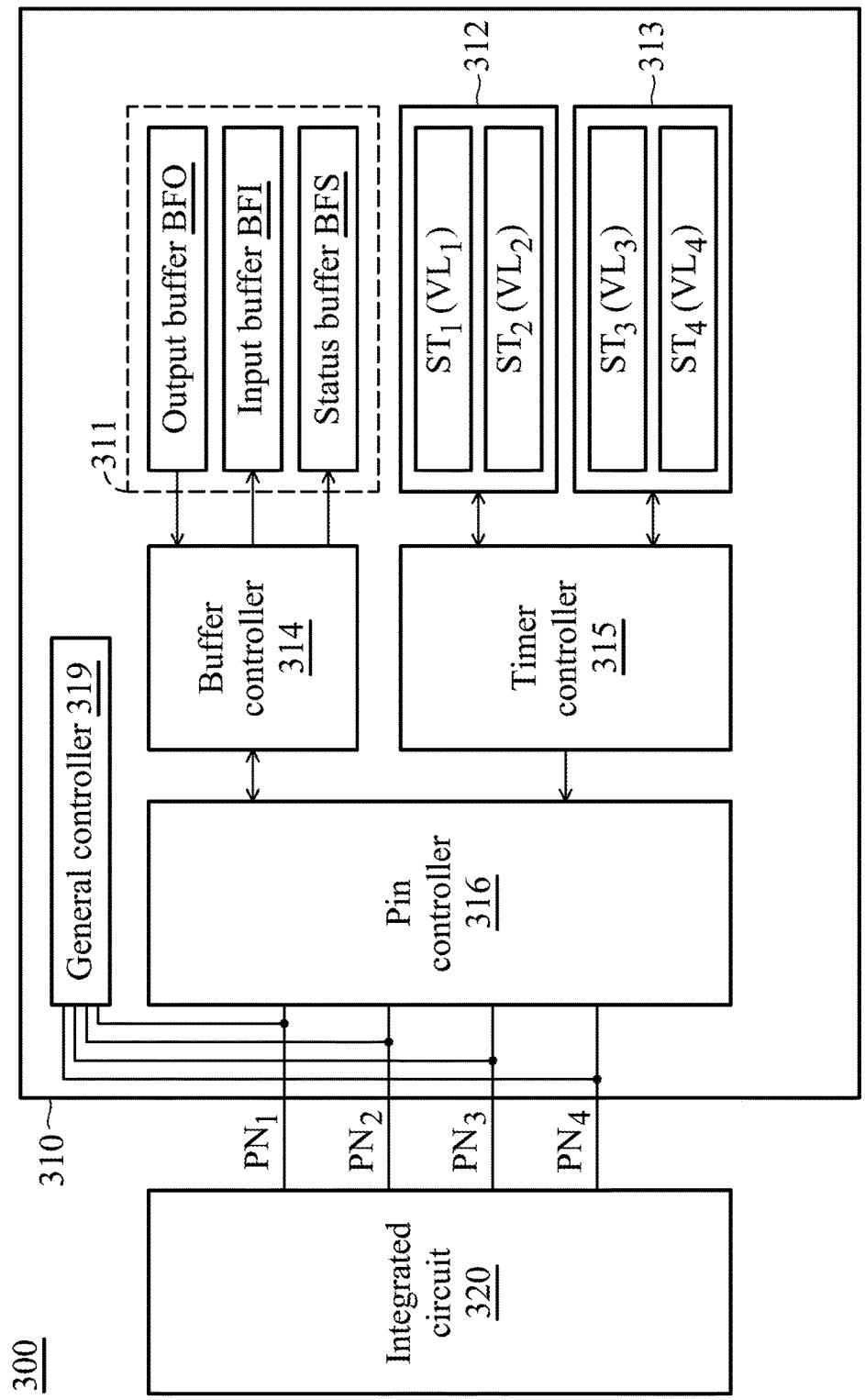
FIG. 3 is a schematic diagram of another exemplary embodiment of an operating system according to various aspects of the present disclosure.

FIG. 3 is a schematic diagram of another exemplary embodiment of an operating system, according to various aspects of the present disclosure. FIG. 3 is similar to FIG. 1 exception that the control circuit 310 of the operating system 300 further comprises a general controller 319. Since the features of the input/output buffer 311, the times 312 and 313, the buffer controller 314, the timer controller 315 and the pin controller 316 are the same as the features of the input/output buffer 111, the times 112 and 113, the buffer controller 114, the timer controller 115 and the pin controller 116 shown in FIG. 1, the descriptions of the features of the input/output buffer 311, the times 312 and 313, the buffer controller 314, the timer controller 315 and the pin controller 316 are omitted.

In this embodiment, when the pin controller 316 operates in the input mode or the output mode, the general controller 319 is configured to set initial voltage levels of the pins $PN_1 \sim PN_4$ and final voltage levels of the pins $PN_1 \sim PN_4$. Taking FIG. 4C as an example, the general controller 319 sets the initial voltage level of the pin $PN_1$ at a low level before the checkpoint $P_0$ and sets the final voltage level of the pin $PN_1$ at the low level after the checkpoint $P_1$. In other embodiment, the general controller 319 can be applied in the control circuit 210 shown in FIG. 2.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A control circuit for programming levels of pins, comprising:
    a first slot configured to adjust a first count value according to a clock signal;
    a timer controller configured to determine whether the first count value is equal to a first predetermined value, wherein when the first count value is equal to the first predetermined value, the timer controller generates a first trigger signal;
    an input/output buffer;
    a buffer controller configured to access the input/output buffer; and
    a pin controller coupled to a first pin, the timer controller and the buffer controller,
    wherein in an input mode, the pin controller detects a voltage level of the first pin according to the first trigger signal to generate a plurality of detection results, and the pin controller stores the plurality of detection results into the input/output buffer via the buffer controller, and
    wherein in an output mode, the pin controller generates an output signal according to the first trigger signal and output data stored in the input/output buffer.

2. The control circuit as claimed in claim 1, wherein the pin controller outputs the output signal via the first pin.

3. The control circuit as claimed in claim 1, wherein the pin controller outputs the output signal via a second pin.

4. The control circuit as claimed in claim 1, further comprising:
    a second slot configured to adjust a second count value according to the clock signal, wherein when the second count value is equal to a second predetermined value, the timer controller outputs a second trigger signal,
    wherein in the input mode, the pin controller detects the voltage level of the first pin according to the first and second trigger signals to generate the plurality of detection results, and
    wherein in the output mode, the pin controller generates the output signal according to the first and second trigger signals and the output data stored in the input/output buffer.

5. The control circuit as claimed in claim 4, wherein the second predetermined value is different from or the same as the first predetermined value.

6. The control circuit as claimed in claim 4, further comprising:
    an interrupt controller configured to provide an interruption signal to a controller when the pin controller receives the first or second trigger signal, wherein the controller executes a predetermined programmed code according to the interruption signal.

7. The control circuit as claimed in claim 1, wherein the input/output buffer comprises:
    an output buffer configured to store the output data;
    an input buffer configured to store a first detection result among the plurality of detection results, wherein the first detection result indicates input data; and
    a status buffer configured to store a second detection result among the plurality of detection results, wherein the second detection result indicates status data.

8. The control circuit as claimed in claim 1, wherein when the pin controller receives the first trigger signal, the pin controller waits a predetermined time and then detects the voltage level of the first pin to generate one of the plurality of detection results.

9. The control circuit as claimed in claim 1, further comprising:
a general controller configured to set an initial voltage level of the first pin and a final voltage level of the first pin.

10. The control circuit as claimed in claim 1, wherein the timer controller sets the first predetermined value according to a programmed code.

11. An operating system comprising:
an integrated circuit; and
a control circuit coupled to the integrated circuit via a first pin and comprising:
a first slot configured to adjust a first count value according to a clock signal;
a timer controller configured to generates a first trigger signal when the first count value is equal to a first predetermined value;
an input/output buffer;
a buffer controller configured to access the input/output buffer;
a pin controller coupled to the first pin, the timer controller and the buffer controller,
wherein in an input mode, the pin controller detects a voltage level of the first pin according to the first trigger signal to generate a plurality of detection results and the pin controller stores the plurality of detection results to the input/output buffer via the buffer controller, and
wherein in an output mode, the pin controller generates an output signal to the integrated circuit according to the first trigger signal and output data stored in the input/output buffer.

12. The operating system as claimed in claim 11, wherein the pin controller outputs the output signal to the integrated circuit via the first pin.

13. The operating system as claimed in claim 11, wherein the pin controller outputs the output signal to the integrated circuit via a second pin.

14. The operating system as claimed in claim 11, further comprising:
a second slot configured to adjust a second count value according to the clock signal, wherein when the second count value is equal to a second predetermined value, the timer controller outputs a second trigger signal,
wherein in the input mode, the pin controller detects the voltage level of the first pin according to the first and second trigger signals to generate the plurality of detection results, and
wherein in the output mode, the pin controller generates the output signal according to the first and second trigger signals and the output data stored in the input/output buffer.

15. The operating system as claimed in claim 14, wherein the second predetermined value is different from or the same as the first predetermined value.

16. The operating system as claimed in claim 14, further comprising:
an interrupt controller configured to provide an interruption signal to a controller when the pin controller receives the first or second trigger signal, wherein the controller executes a predetermined programmed code according to the interruption signal.

17. The operating system as claimed in claim 11, wherein the input/output buffer comprises:
an output buffer configured to store the output data;
an input buffer configured to store a first detection result among the plurality of detection results, wherein the first detection result indicates input data; and
a status buffer configured to store a second detection result among the plurality of detection results, wherein the second detection result indicates status data.

18. The operating system as claimed in claim 11, wherein when the pin controller receives the first trigger signal, the pin controller waits a predetermined time and then detects the voltage level of the first pin to generate one of the plurality of detection results.

19. The operating system as claimed in claim 11, further comprising:
a general controller configured to set an initial voltage level of the first pin and a final voltage level of the first pin.

20. The operating system as claimed in claim 11, wherein the timer controller sets the first predetermined value according to a programmed code.

* * * * *